5805X
E. WARREN.
THRASHING MACHINE.
Patented Jan. 29, 1830.
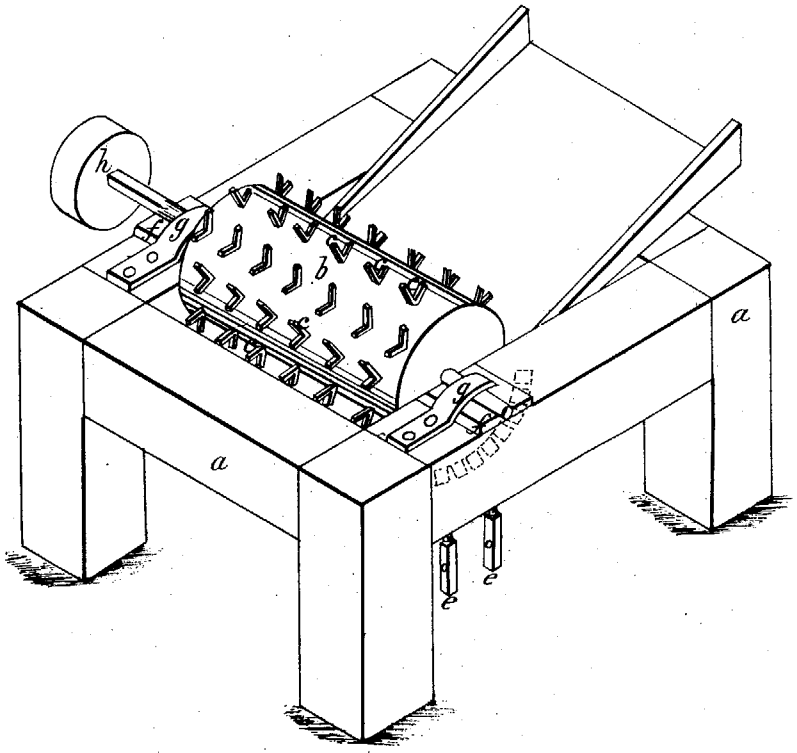
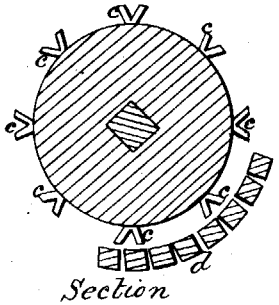
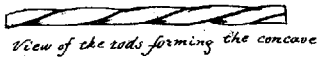
View of the teeth forming the concave
THE NORRIS PETERS CO., PHOTO-LITHO., WASHINGTON, D. C.

X3805 Jan 29. 1830 449.

Edmund Warren
Jan 29, 1830

Letters Patent

The Schedule referred to in these Letters Patent and making part of the same
containing a description in the words of the said Edmund Warren himself
of his Improvement in the ... Thrashing Machine for Corn & all kind of grain
and Seed.

This Machine is constructed by a frame of Wood or iron, of a
size to suit the power to be applied. but a size suitable to be drove by one
Horse, is two feet wide, and about two feet eight inches long, and may be
from two feet six inches, to two feet eight inches high. A cylinder of
some wood about twenty four inches long. with spurs of iron about
one inch long, and five eighths of an inch in diameter or square & in
rows about four inches apart. the space of one row coming in range of
the Spur of the next. and so on interchangeably round the surface
of the cylinder. The size of which should be proportioned to the ve-
locity to be given. A twelve inch cylinder should be so geared as to give
sixteen hundred revolutions in a minute. A concave is formed by round
bars of iron about five eighths of an inch diameter. or square bars
about the same size twisted forming a spiral surface these are sta-
tioned so as not to turn and are about eight in number, and one fourth
of an inch from each other beginning within three inches of the top
of the machine on which the cylinder is Stationed and passing under
a little passed the centre of the cylinder and near enough to suit the
grain to be thrashed. the cylinder being governed by screws to raise or
lower. and being suspended on roller boxes which are held down by springs
an inclined box is placed on the back part of the machine, the forward
part of which comes close to the first bar of the concave to conduct the
grain or corn in under the cylinder. The shaft of the cylinder extends
out on one side of the machine, on which a whirl is made fast to
apply the band from a drum or wheel to put the machine in mo-
tion. The grain or corn passes between the surface of the spurs of
the cylinder and the concave of bars.

What is claimed by this improvement is

[illegible]

X5805 the spring acting upon the gains over the concave bars.

Witnesses
Samuel A. Porter
William Bagley

Edmund Warren (462 words)

(Patented January 29. 1830)